(12) United States Patent
Kim

(10) Patent No.: US 8,336,522 B2
(45) Date of Patent: Dec. 25, 2012

(54) ENGINE REVOLUTION SPEED CONTROL SYSTEM FOR CONSTRUCTION MACHINE

(75) Inventor: Young Chul Kim, Gyeongsanganam-do (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 338 days.

(21) Appl. No.: 12/689,863

(22) Filed: Jan. 19, 2010

(65) Prior Publication Data

US 2010/0180862 A1 Jul. 22, 2010

(30) Foreign Application Priority Data

Jan. 19, 2009 (KR) .......................... 10-2009-004205

(51) Int. Cl.
*F02D 41/14* (2006.01)

(52) U.S. Cl. ........................................ 123/350; 123/361

(58) Field of Classification Search .................. 123/349, 123/350, 356, 360, 361
See application file for complete search history.

(56) References Cited

U.S. PATENT DOCUMENTS

| | | | | |
|---|---|---|---|---|
| 4,058,094 A * | 11/1977 | Moore | ........................... | 123/356 |
| 4,867,261 A * | 9/1989 | King | ............................. | 180/179 |
| 5,138,996 A * | 8/1992 | Fiorenza, II | .................. | 123/335 |
| 5,251,440 A * | 10/1993 | Bong-dong et al. | ............ | 60/329 |
| 5,335,487 A * | 8/1994 | Murakawa et al. | ............. | 56/10.5 |
| 5,394,954 A * | 3/1995 | Tashiro et al. | ................ | 180/178 |
| 6,178,371 B1 * | 1/2001 | Light et al. | ...................... | 701/93 |
| 6,925,376 B2 * | 8/2005 | Li et al. | ......................... | 701/114 |
| 7,979,183 B2 * | 7/2011 | Toda | .............................. | 701/50 |
| 8,010,260 B2 * | 8/2011 | Toda | .............................. | 701/50 |
| 2008/0047245 A1 * | 2/2008 | MacGregor et al. | ........... | 56/10.8 |

* cited by examiner

*Primary Examiner* — Erick Solis
(74) *Attorney, Agent, or Firm* — Ladas & Parry LLP

(57) ABSTRACT

An engine revolution speed control system for a construction machine is disclosed. The engine revolution speed control system includes an input unit that sets an engine revolution speed by a user, outputs a setting process as a set signal, and determines whether or not an engine is driven at a set engine revolution speed; a control unit that receives the set signal and stores the set engine revolution speed, receives the set signal and an ON/OFF signal to output an output signal corresponding to the received set signal and the ON/OFF signal, and controls operation of the engine at the set engine revolution speed in accordance with the ON/OFF signal; and a display that receives the output signal to visually output the setting process or whether or not the engine is driven at the set engine revolution speed.

4 Claims, 3 Drawing Sheets

ENGINE REVOLUTION SPEED CONTROL SYSTEM FOR CONSTRUCTION MACHINE

CROSS-REFERENCE TO RELATED APPLICATIONS

This application is based on and claims priority from Korean Patent Application No. 10-2009-4205, filed on Jan. 19, 2009, in the Korean Intellectual Property Office, the disclosure of which is incorporated herein in its entirety by reference.

FIELD OF THE DISCLOSURE

The present disclosure relates to an engine evolution speed control system for a construction machine such as an excavator, and more specifically, to an engine revolution speed control system capable of allowing a driver to set an engine revolution speed and driving an engine of an excavator quickly and accurately at a predetermined revolution speed in case of requiring a revolution speed set depending upon working circumferences.

BACKGROUND OF THE DISCLOSURE

For a construction machine such as a hydraulic exactor, it is preferable that energy saving is carried out upon various operations such as swiveling, traveling, excavating, landing, or loading, since working speed and amount are significantly varied depending upon a kind of operation. For example, the excavator usually selects either high speed or low speed upon traveling, and selects either heavy excavating operation or light excavating operation upon excavating.

An excavator of a related art includes an engine revolution speed control switch 100 and a mode selection switch 200, as illustrated in FIG. 1, so that a driver can control an engine revolution speed by rotating the engine revolution speed control switch 100 to an appropriate level or switching the mode selection switch 200 to a heavy excavating mode, a standard excavating mode or a light excavating mode, in accordance with working circumferences.

However, since the engine revolution speed control switch 100 and the mode selection switch 200 are configured as a dial manner which is manually operated, it is difficult to manipulate the switches precisely. Consequently, if it is set to a level higher than a standard engine revolution speed suitable for the working circumferences, it is likely to have serious problems such as excessive consumption of fuel, overload of the engine, or overheating of the engine. On the contrary, if it is set to a low level, there is a problem in a shortage of power.

Further, in order to manipulate the engine revolution speed control switch 100 and the mode selection switch 200, after a driver takes his hands off a manipulation lever and interrupts the working, the driver has to manipulate the switches. Therefore, there is a problem of deteriorating a working efficiency because of a vacuum in working.

SUMMARY OF THE DISCLOSURE

Accordingly, the present disclosure is intended to solve the above-mentioned problems occurring in the prior art while advantages achieved by the prior art are maintained intact.

One object of the present disclosure is to provide an engine revolution speed control system for an excavator capable of allowing a driver to set an engine revolution speed depending upon working circumferences, and quickly driving an engine at a set engine revolution speed, in case of necessarily driving the engine at the set engine revolution speed, without making a vacuum in working.

In order to accomplish these objects, there is provided an engine revolution speed control system for a construction machine, including an input unit that sets an engine revolution speed by a user, outputs a setting process as a set signal, and determines whether or not an engine is driven at a set engine revolution speed; a control unit that receives the set signal and stores the set engine revolution speed, receives the set signal and an ON/OFF signal to output an output signal corresponding to the received set signal and the ON/OFF signal, and controls operation of the engine at the set engine revolution speed in accordance with the ON/OFF signal; and a display that receives the output signal to visually output the setting process or whether or not the engine is driven at the set engine revolution speed.

Preferably, the input unit includes a setting switch for inputting information on a process of setting the engine revolution speed, an ON/OFF switch for inputting information on whether or not the engine is driven at the set engine revolution speed, the setting switch and the ON/OFF switch being provided on an upper portion of the control unit, and a signal generating means for outputting information on the input setting process as a set signal, and outputting information whether or not the engine is driven at the engine revolution speed, as a driving signal.

Preferably, the signal generating means outputs an ON signal if the ON/OFF switch is firstly manipulated, and the signal generating means outputs an OFF signal if the ON/OFF switch is secondary manipulated.

Preferably, the control signal controls the engine at the engine revolution speed set in the input unit if an ON signal is received, and the control signal controls the engine at the engine revolution speed set in an engine revolution speed control switch if an OFF signal is received.

Preferably, the control unit is connected to an engine revolution speed detecting sensor for measuring a current engine revolution speed to output a rotation signal, and a governor for maintaining the engine revolution speed at a constant level, and the control unit receives the rotation signal from the engine revolution speed detecting sensor to perceive a current engine revolution speed, and wherein even though the engine is driven at the engine revolution speed set in accordance with the ON signal, if the set engine revolution speed is different from the current engine revolution speed, the control unit drives the engine constantly at the engine revolution speed set by the governor.

With the engine revolution speed control system according to the present disclosure, a driver can set accurately the engine revolution speed set to be suitable for the working circumferences by using the input unit and the display, and drive the engine accurately at the engine revolution speed set to be suitable for the working circumferences only by manipulating the ON/OFF switch of the input unit, thereby preventing occurrence of serious problems such as excessive consumption of fuel, overload of the engine, overheating of the engine, or shortage of power.

Further, the driver can drive the engine quickly at the set engine revolution speed by manipulating the setting switch and the ON/OFF switch, while holding a manipulation lever during working, thereby preventing occurrence of a vacuum in working and thus enhancing a working efficiency.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, exemplary embodiments of the present disclosure will be described with reference to the accompanying drawings. The matters defined in the description, such as the detailed construction and elements, are nothing but specific details provided to assist those of ordinary skill in the art in a comprehensive understanding of the present disclosure, and thus the present disclosure is not limited thereto.

Figure 1:
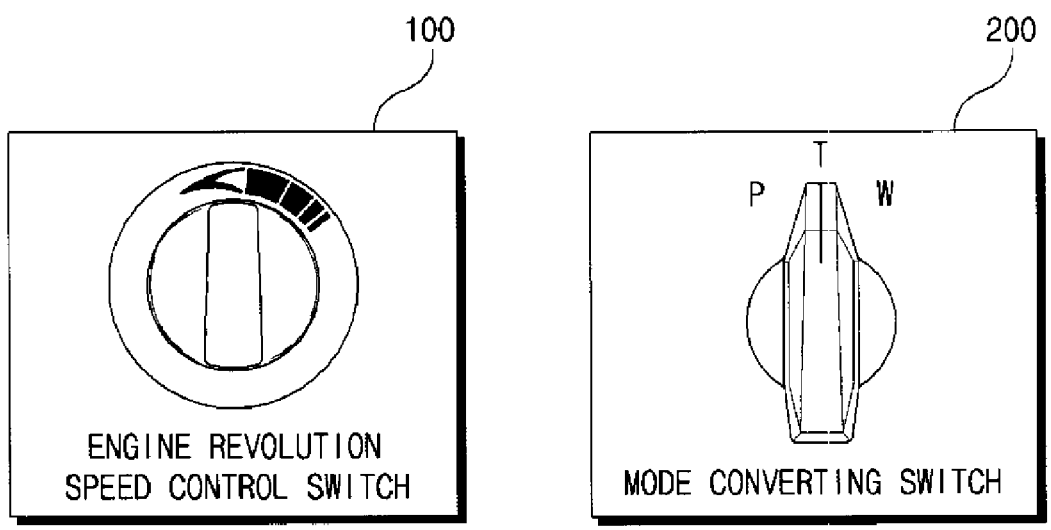
FIG. 1 is a diagram illustrating an engine revolution speed control switch and a mode selection switch in an excavator of a related art.
Figure 2:
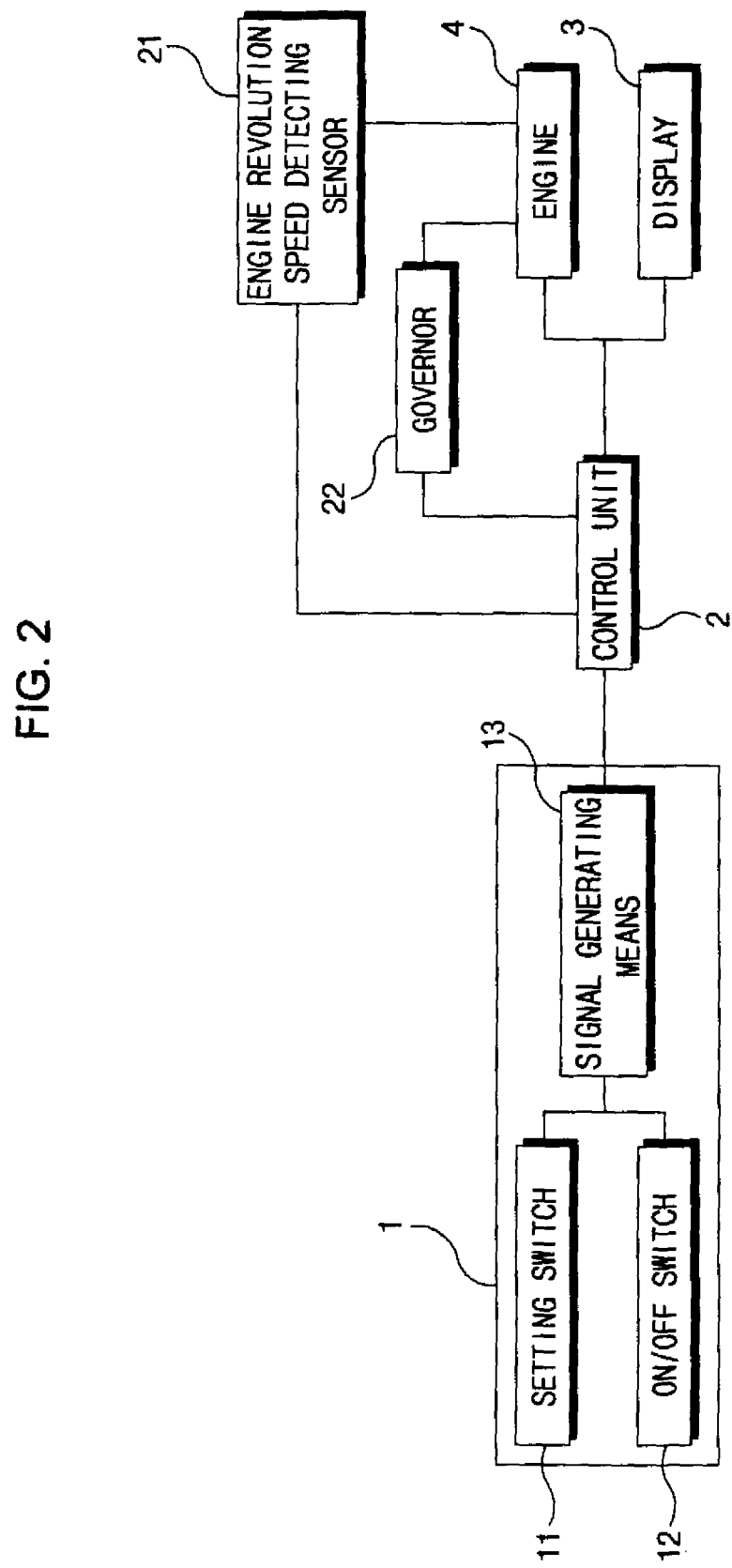
FIG. 2 is a block diagram of an engine revolution speed control system for an excavator according to an embodiment of the present disclosure.

FIG. 2 is a block diagram of an engine revolution speed control system for an excavator according to an embodiment of the present disclosure.

Referring to FIG. 2, the engine revolution speed control system for the excavator according to an embodiment of the present disclosure includes an input unit 1 for setting an engine revolution speed and determining whether or not an engine is driven at a set engine revolution speed, a control unit 2 for controlling storage of a set engine revolution speed, and operation of the engine and a display, a display 3 for visually outputting a process of setting the engine revolution speed and whether or not the engine is driven at a set engine revolution speed, an engine revolution speed detecting sensor 21 for measuring an engine revolution speed, a governor 23 for maintaining the engine revolution speed at a constant level, and an engine 4 for the excavator.

Figure 3:
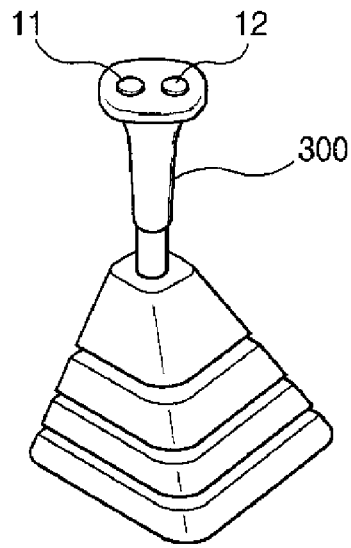
FIG. 3 is a perspective view illustrating a manipulation lever equipped with an input unit of the engine revolution speed control system of the excavator shown in FIG. 2.

FIG. 3 is a perspective view illustrating the manipulation lever equipped with the input unit of the engine revolution speed control system of the excavator shown in FIG. 2. As shown in the figure, the manipulation lever 300 includes a setting switch 11 and an ON/OFF switch 12 for the input unit, and the input unit 1 may include a signal generating means 13.

Referring to FIG. 3, the setting switch 11 and the ON/OFF switch 12 of the input unit 1 are provided on an upper portion of the manipulation lever 300, which is different from the engine revolution speed control switch 100 of the related art. According to the engine revolution speed control switch 100 of the related art, if adjustment of the engine revolution speed is required during working, a driver has to take his hands off the manipulation lever. On the contrary, with the input unit 1 according to an embodiment of the present disclosure, a driver can manipulate the setting switch 11 and the ON/OFF switch 12 while holding the manipulation lever 300 during working, thereby preventing occurrence of a vacuum in working and thus enhancing a working efficiency.

More specifically, the input unit 1 is a means for enabling a driver to set an engine revolution speed through manipulation, and outputs the set engine revolution speed to the control unit 2 as a signal.

Preferably, the setting switch 11 has a function of inputting information on a process of setting the engine revolution speed by the driver, and converting the input information on the setting process into a set signal to output it to the control unit 2.

In addition, the input unit 1 is a means for determining whether or not the engine is driven at an engine revolution speed set by manipulation of the driver, and outputs an ON/OFF signal which determines the driving of the engine 4 in accordance with the set engine revolution speed, to the control unit 2. That is, in order to drive the engine 4 in accordance with the set engine revolution speed, the input unit 1 outputs the ON signal to the control unit 2, and in order to drive the engine 4 at the engine revolution speed set by the engine revolution speed control switch of the related art, the input unit 1 outputs on OFF signal to the control unit 2.

Preferably, the ON/OFF switch 12 inputs information on whether or not the engine is driven at the engine revolution speed set by the driver, and the signal generating means 13 converts the input information to the control unit 2. Further, the signal generating means 13 outputs the ON signal when the driver firstly manipulates the ON/OFF switch 12, and outputs the OFF signal when the driver secondly manipulates the ON/OFF switch 12, thereby easily determining whether or not the engine is driven at the engine revolution speed set by the driver.

Moreover, the control unit 2 receives the set signal from the input unit 1 to store the set engine revolution speed, and outputs an output signal corresponding to the process of setting the engine revolution speed to output it to the display 3.

More specifically, in the case in which the control unit 2 stores the set engine revolution speed and receives the ON signal, the control unit 2 has a function of driving the engine 4 in accordance with the set engine revolution speed, and controlling the display 3 to output the setting process in accordance with the set signal input from the input unit 1.

Further, the control unit 2 receives the ON/OFF signal from the input unit 1, and outputs an output signal corresponding to the driving of the engine at the set engine revolution speed to the display 3.

More specifically, in the case in which the control unit 2 receives the ON signal, the control unit controls the display 3 to output the state in which the engine 4 is driven at the engine revolution speed set in the input unit 1. In the case in which the control unit 2 receives the OFF signal, the control unit controls the display 3 to output the state in which the engine 4 is driven at the engine revolution speed set in the engine revolution speed control switch 100 of the related art.

Moreover, the control unit 2 receives the ON/OFF signal from the input unit 1, and controls whether the engine 4 is driven at the set engine revolution speed.

More specifically, in the case in which the control unit 2 receives the ON signal, the control unit drives the engine 4 at the engine revolution speed set in the input unit 1. In the case in which the control unit 2 receives the OFF signal, the control unit drives the engine 4 at the engine revolution speed set in the engine revolution speed control switch 100 of the related art.

Preferably, the control unit 2 adjusts a throttle valve to control inflow of a fuel, thereby adjusting the engine revolution speed.

Preferably, the control unit 2 is connected to the engine revolution speed detecting sensor 21 for measuring a current engine revolution speed, and the governor 23 for maintaining the engine revolution speed at a constant level. The control unit 2 receives a rotation signal from the engine revolution speed detecting sensor 21, and perceives the current engine revolution speed. Even though the engine 4 is driven at the engine revolution speed set in the input unit 1 in accordance with the ON signal, if the set engine revolution speed is different from the current engine revolution speed, the control unit drives the engine 4 constantly at the engine revolution speed set by the governor. That is, in the case in which an error occurs between the set engine revolution speed and the current engine revolution speed when the engine is driven at the set engine revolution speed, the control unit 2 may further have a function of correcting the error.

Figure 4A:
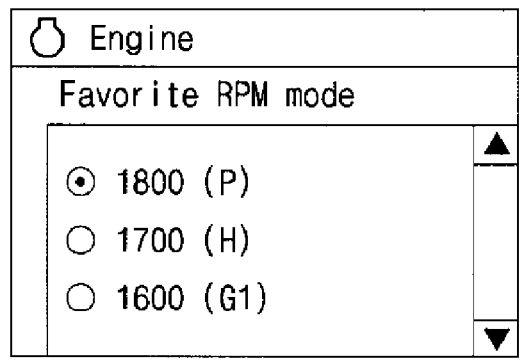
FIGS. 4A and 4B are diagrams illustrating a display of the engine revolution speed control system for the excavator shown in FIG. 2.
Figure 4B:
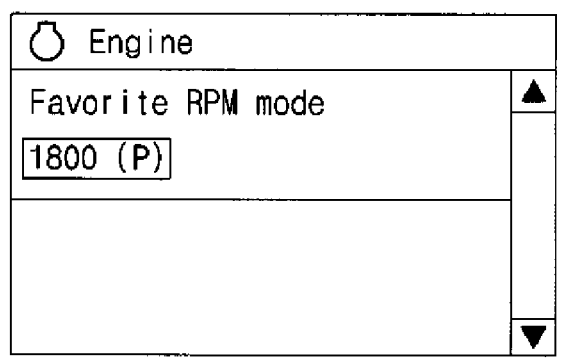

FIGS. 4A and 4B are diagrams illustrating the display of the engine revolution speed control system for the excavator shown in FIG. 2. As shown in FIG. 4A, the display 3 visually outputs the process of setting the engine revolution speed, and as shown in FIG. 4B, the display 3 visually outputs whether or not the engine is driven at the set engine revolution speed.

More specifically, the display 3 is an output means for enabling the driver to visually perceive the process of setting the engine revolution speed and the driving of the engine at the engine revolution speed. The display 3 receives the output signal from the control unit 2, and converts it into a visible signal to visually output the process of setting the engine revolution speed and the driving of the engine at the engine revolution speed. Consequently, if the driver sets the engine revolution speed by manipulating the setting switch 11 of the input unit 1, the driver can quickly and accurately set the engine revolution speed while viewing the setting process through the display 3. In addition, if the engine 4 is driven at the engine revolution speed set by manipulating the ON/OFF switch 12 of the input unit 1, the driver can visually perceive the driving of the engine at the set engine revolution speed.

The operation of the engine revolution speed control system according to an embodiment of the present disclosure will now be described.

First, the driver sets the engine revolution speed suitable for the working circumferences by manipulating the setting switch 11 of the input unit 1. The setting process is outputted as the set signal by the signal generating means 13, and the control unit 2 receives the signal, stores the set engine revolution speed, and outputs the output signal corresponding to the setting process to the display 3. As shown in FIG. 4A, the display 3 receives the output signal, and converts it into a visible signal to enable the driver to visibly perceive the process of setting the engine revolution speed.

That is, the driver can visually perceive the setting process through the display 3 while manipulating the setting switch 11. Consequently, the driver can quickly and accurately set the engine revolution speed.

After that, when the engine 4 is necessarily driven at the set engine revolution speed, the driver manipulates the ON/OFF switch 12 of the input unit 1 to output the ON signal to the control unit 2.

Further, the control unit 2 receives the ON signal from the input unit 1, outputs the output signal corresponding to the driving of the engine at the set engine revolution speed to the display 3, and drives the engine 4 in accordance with the set engine revolution speed.

As shown in FIG. 4B, the display 3 displays the state in which the engine 4 is driven at the engine revolution speed set by the output signal, thereby enabling the driver to visually perceive the state.

As a result, the driver can drive the engine 4 quickly and accurately at the set engine revolution speed only by manipulating the ON/OFF switch 12 provided on the upper portion of the manipulation lever 300 during working, and verify the state through the display 3.

Meanwhile, in order to drive the engine 4 at the engine revolution speed set by the engine revolution speed control switch 100 of the related art, the driver manipulates the ON/OFF switch 12 of the input unit 1 to output the OFF signal to the control unit 2.

Also, if the control unit 2 receives the OFF signal, the control unit 2 outputs the output signal corresponding to the engine revolution speed set by the engine revolution speed control switch 100 of the related art to the display 3, and drives the engine 4 in accordance with the engine revolution speed set by the engine revolution speed control switch 100 of the related art.

Next, the display 3 receives the output signal, and displays the state in which the engine 4 is driven in accordance with the engine revolution speed set by the engine revolution speed control switch 100 of the related art, thereby enabling the driver to visually perceive it.

As a result, the driver can drive the engine 4 at the engine revolution speed by the engine revolution speed control switch 100 of the related art, only by manipulating the ON/OFF switch 12 provided on the upper portion of the manipulation lever 300 during working, and verify the state through the display 3.

Therefore, the driver can set the engine revolution speed suitable for the working circumferences by manipulating the setting switch 11 of the input unit provided on the upper portion of the manipulation lever 300, drive the engine 4 accurately at the engine revolution speed set by manipulating the ON/OFF switch 12 of the input unit 1, or drive the engine 4 at the engine revolution speed set by the engine revolution speed control switch 100 of the related art, thereby preventing occurrence of a vacuum in working and thus enhancing a working efficiency.

Further, an output of a hydraulic pump can be appropriately controlled under working circumferences by driving the engine 4 at the engine revolution speed set by the engine revolution speed control switch for the excavator to supply a hydraulic pressure.

Although exemplary embodiments of the present disclosure have been described for illustrative purposes, those skilled in the art will appreciate that various modifications, additions and substitutions are possible, without departing from the scope and spirit of the present disclosure as disclosed in the accompanying claims.

The invention claimed is:

1. An engine revolution speed control system for a construction machine, comprising:

a device that can be grasped in a hand of a user to manipulate the construction equipment during operation of the construction equipment:

an input unit that sets an engine revolution speed by the user, outputs a setting process as a set signal, and determines whether or not an engine is driven at a set engine revolution speed, wherein the input unit includes a setting switch for inputting information on a process of setting the engine revolution speed, an ON/OFF switch for inputting information on whether or not the engine is driven at the set engine revolution speed, the setting switch and the ON/OFF switch being disposed on the device such that the user can manipulate the setting switch and ON/OFF switch without removing the hand from the device;

a signal generating means for outputting information on the input setting process as a set signal, and outputting information whether or not the engine is driven at the engine revolution speed, as a driving signal;

a control unit that receives the set signal and stores the set engine revolution speed, receives the set signal and the ON/OFF signal to output an output signal corresponding to the received set signal and the ON/OFF signal, and controls operation of the engine at the set engine revolution speed in accordance with the ON/OFF signal; and a display that receives the output signal to visually output the setting process or whether or not the engine is setting the engine revolution speed.

2. The engine revolution speed control system according to claim 1, wherein the signal generating means outputs an ON signal if the ON/OFF switch is firstly manipulated, and the signal generating means outputs an OFF signal if the ON/OFF switch is secondarily manipulated.

3. The engine revolution speed control system according to claim 1, wherein the system also comprises an engine revolution speed control switch, and wherein the control signal controls the engine at the engine revolution speed set in the input unit if an ON signal is received, and the control signal controls the engine at the engine revolution speed set in the engine revolution speed control switch if an OFF signal is received.

4. The engine revolution speed control system according to claim 1, wherein the control unit is connected to an engine revolution speed detecting sensor for measuring a current engine revolution speed to output a rotation signal, and a governor for maintaining the engine revolution speed at a constant level, and the control unit receives the rotation signal from the engine revolution speed detecting sensor to perceive a current engine revolution speed, and wherein even though the engine is driven at the engine revolution speed set in accordance with the ON signal, if the set engine revolution speed is different from the current engine revolution speed, the control unit drives the engine constantly at the engine revolution speed set by the governor.

\* \* \* \* \*